(12) United States Patent
Lai

(10) Patent No.: US 9,187,111 B2
(45) Date of Patent: Nov. 17, 2015

(54) TOOL-FREE SHELVING SYSTEM

(71) Applicant: Hsiu-Chen Lai, Diamond Bar, CA (US)

(72) Inventor: Hsiu-Chen Lai, Diamond Bar, CA (US)

(73) Assignee: Valor Enterprise Co. Ltd., Changhua (TW)

( * ) Notice: Subject to any disclaimer, the term of this patent is extended or adjusted under 35 U.S.C. 154(b) by 116 days.

(21) Appl. No.: 14/046,939

(22) Filed: Oct. 5, 2013

(65) Prior Publication Data

US 2015/0096953 A1    Apr. 9, 2015

(51) Int. Cl.
*A47F 7/00* (2006.01)
*A47B 43/00* (2006.01)
*A47B 47/00* (2006.01)
*A47B 57/00* (2006.01)
(Continued)

(52) U.S. Cl.
CPC ............... *B62B 3/10* (2013.01); *A47B 47/0083* (2013.01); *A47B 47/024* (2013.01); *A47B 57/08* (2013.01); *A47B 57/16* (2013.01); *A47B 57/20* (2013.01); *A47B 57/404* (2013.01); *A47B 57/406* (2013.01); *A47B 57/48* (2013.01); *A47B 96/066* (2013.01); *A47F 5/108* (2013.01); *A47F 5/137* (2013.01); *A47B 2031/003* (2013.01); *A47B 2031/004* (2013.01)

(58) Field of Classification Search
CPC .......... F16M 11/42; A47F 5/10; A47F 5/101; A47F 5/108; A47F 5/13; A47F 5/135; A47F 5/137; A47F 5/0018; A47F 5/0031; A47B 47/0083; A47B 96/06; A47B 96/02; A47B 96/024; A47B 96/063; A47B 96/066; A47B 96/068; A47B 96/14; A47B 47/00; A47B 47/02; A47B 47/021; A47B 47/024; A47B 47/04; A47B 47/045; A47B 57/00; A47B 57/06; A47B 57/08; A47B 57/10; A47B 57/16; A47B 57/18; A47B 57/20; A47B 57/22; A47B 57/32; A47B 57/34; A47B 57/40; A47B 57/404; A47B 57/406; A47B 57/44; A47B 57/48; A47B 57/482; A47B 57/485; A47B 57/50; A47B 3/00; A47B 2031/002; A47B 2031/004; A47B 2031/005; A47B 9/14; A47B 2031/003; B62B 3/10
USPC ......... 211/183, 181.1, 197, 196, 106.01, 207, 211/190, 192, 186, 187, 189; 108/147.11–147.18, 96, 106, 107, 110, 108/144.11; 248/219.3, 219.4, 235, 239, 248/304, 128, 129, 158, 411, 159; 280/79.3
See application file for complete search history.

(56) References Cited

U.S. PATENT DOCUMENTS 1,938,217 A * 12/1933 Darbyshire .................. 248/250
2,762,669 A *  9/1956 Watson ......................... 108/91
(Continued)

*Primary Examiner* — Jennifer E Novosad
(74) *Attorney, Agent, or Firm* — Che-Yang Chen; Law Office of Michael Chen

(57) ABSTRACT

A tool-free shelving system may include a body and at least one bearing plate, said bearing plate is disposed onto the body and assembled to the body with the protruding portion of the positioning knob located at the inner side of the vertical section of the "∩" shaped frames. The body has two "∩" shaped frames, which are connected with two "U" shaped frames. The "U" shaped frames have four rods protruding downwards and each rod is interposed into the tubes of a pulley. The bearing plate may consist of two parallel side borders, with each end of the side border connected with a fixing apparatus, and a mesh-like support structure between the two borders. This shelf allows convenient tool-free shelving system installation and provides opportunity for customers to enjoy the process of assembling the shelf.

4 Claims, 6 Drawing Sheets

(51) Int. Cl.
  *B62B 3/10* (2006.01)
  *A47B 96/06* (2006.01)
  *A47F 5/10* (2006.01)
  *A47B 57/08* (2006.01)
  *A47F 5/13* (2006.01)
  *A47B 57/48* (2006.01)
  *A47B 57/40* (2006.01)
  *A47B 57/20* (2006.01)
  *A47B 57/16* (2006.01)
  *A47B 47/02* (2006.01)
  *A47B 31/00* (2006.01)

(56) References Cited

U.S. PATENT DOCUMENTS

| | | | | |
|---|---|---|---|---|
| 3,398,981 A * | 8/1968 | Vincens | | 403/388 |
| 3,596,942 A * | 8/1971 | Zoebelein | | 403/230 |
| 4,052,081 A * | 10/1977 | Becker, III | | 280/79.3 |
| 4,079,678 A * | 3/1978 | Champagne | | 108/110 |
| 4,601,247 A * | 7/1986 | Welch et al. | | 108/152 |
| 4,607,576 A * | 8/1986 | Kranjec | | 108/110 |
| 5,088,420 A * | 2/1992 | Russell | | 108/106 |
| 5,090,725 A * | 2/1992 | Feldner | | 280/651 |
| 5,326,062 A * | 7/1994 | Remmers | | 248/250 |
| 5,947,307 A * | 9/1999 | Battaglia et al. | | 211/187 |
| 6,123,209 A * | 9/2000 | Tseng | | 211/186 |
| 6,253,933 B1 * | 7/2001 | Yang | | 211/187 |
| 6,584,916 B1 * | 7/2003 | Felton et al. | | 108/107 |
| 6,971,528 B2 * | 12/2005 | Chen | | 211/182 |
| 7,059,484 B1 * | 6/2006 | Goldberg | | 211/187 |
| 7,832,571 B2 * | 11/2010 | Felsenthal | | 211/134 |
| 7,967,156 B2 * | 6/2011 | Hsu | | 211/187 |
| 8,640,893 B2 * | 2/2014 | Kessell et al. | | 211/187 |
| 2005/0092706 A1* | 5/2005 | Chang | | 211/187 |
| 2006/0032829 A1* | 2/2006 | Hutzler | | 211/187 |

* cited by examiner

TOOL-FREE SHELVING SYSTEM

FIELD OF INVENTION

The present invention relates to a tool-free do-it-yourself (DIY) shelve, more particularly to a shelve structure that can be DIY installed, uninstalled, or expanded without usage of any tools.

BACKGROUND OF THE INVENTION

In general, shelves and racks built by pipes are mainly manufactured by welding technology to connect the pipe structures. These welded products are structurally strong; however, since they are usually large in size, storing these products may require large space and it is also inconvenient for transporting these products. In addition, since these products cannot be readily uninstalled or expanded, handling of these products after their initial installation is rather inconvenient. Furthermore, the welding process is time-consuming and incurs high cost. And finally, consumer does not have the opportunity to enjoy the fun from the DIY installation process.

Therefore, it has been an objective of research and development for related industries to overcome the shortcomings of the above-mentioned pipe-structured shelves and racks. The present invention describes a further improved shelve structure that can be tool-free DIY installed, which solves the previously mentioned problems of current pipe-structured shelves and racks.

SUMMARY OF THE PRESENT INVENTION

It is widely known that shelves or racks assembled by welding technology occupies a certain space and cannot be readily uninstalled or folded, thus these shelves or racks are thus inconvenient for transporting, storage, or handling. The present invention describes an improved shelve structure that can be tool-free and DIY installed or uninstalled, which solves these problems. The improved shelve also provides customer opportunity to enjoy the process of DIY installation.

The present invention provides a tool-free DIY shelve, which comprises: a body and at least one bearing plate. The body has two "∩" shaped frames linked with two "U" shaped frames and all of these frames are built with tubular structures. The two ends of the "U" shaped frame connect to the two neighboring ends of the "∩" shaped frames, with each of the neighboring end from one "∩" shaped frame. The top two ends of the "U" shaped frame have necking zones with reduced diameter that are inserted into the bottom ends of the "∩" shaped frames. Each of the necking zones has a "V" shaped elastic element located inside of the tubular structure of the necking zone and the elastic element fastens the connection between the "∩" and the "U" shaped frames. The "U" shaped frames have four rods pointing downwards, and each rod is interposed into the tubes of a pulley. The bearing plate is assembled to the body with the protruding portion of the positioning knob. The positioning knob is located at the inner side of the vertical section of the "∩" shaped frames and is fastened to the frame with a horizontal fastening segment extended with an enlarged block. The bearing plate consists of two parallel side borders and a mesh-like support structure between the two borders. Each end of the side border is connected with a fixing apparatus, and the fixing apparatus has a U-shaped notch cut facing downward. The inner portion of the notch cut expands laterally and forms a slit. Both the notch cut and slit do not penetrate through the top side of the fixing apparatus thus the top side of the fixing apparatus remains closed. The above is the brief description of a tool-free DIY shelve claimed in the present invention.

The shelve structure in the present invention has the following advantages over conventional pipe-based shelves and racks: (i) The shelve claimed in the present invention allows tool-free DIY installation by the customers, including the installation of the bearing plate, the "U" shaped and the "∩" shaped frames, as well as the pulleys. This shelve can thus be conveniently installed or uninstalled, thereby providing the opportunity for customers to enjoy the process of DIY installation; (ii) The shelve claimed in the present invention can be readily uninstalled, thus allows convenient handling for either short-distance moving or long-distance transportation after initial installation and also saves storage space; and (iii) The shelve claimed in the present invention allows convenient addition or rearrangement of the bearing plates, and also allows diverse and flexible setup of the bearing plates to meet different needs.

DETAILED DESCRIPTION OF THE INVENTION

Figure 1:
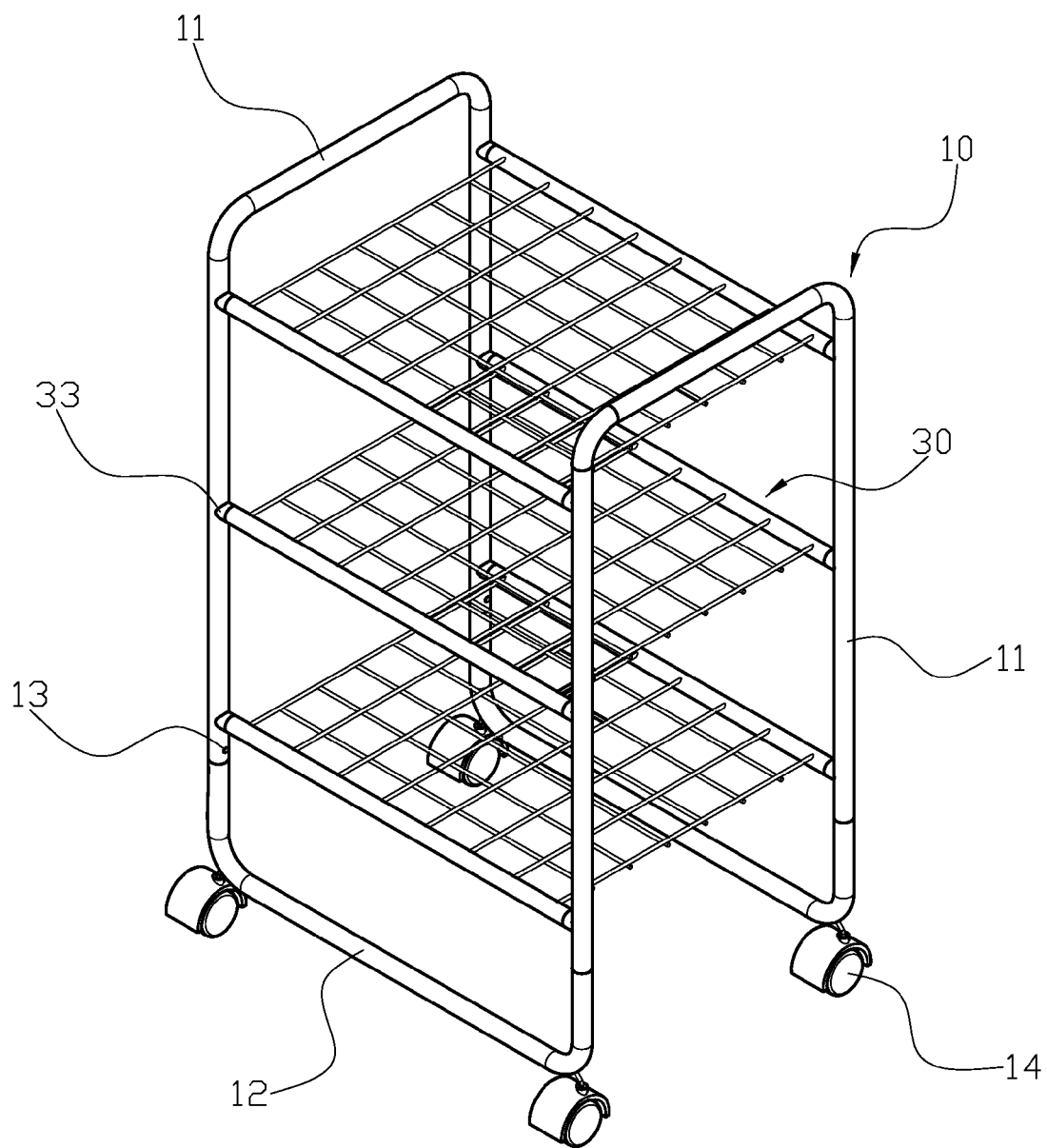
FIG. 1 is a three-dimensional perspective view of the shelve in the present invention.
Figure 2:
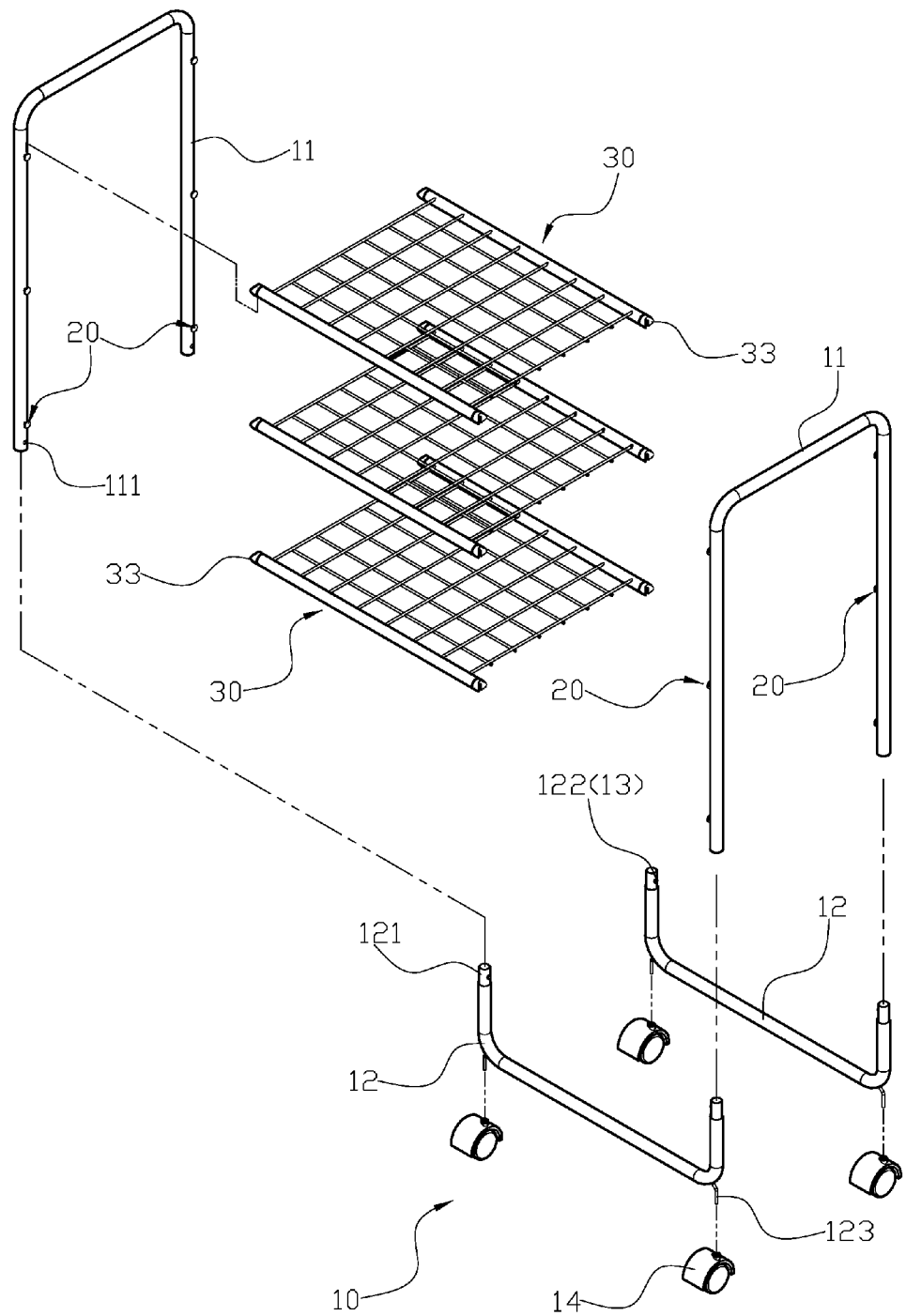
FIG. 2 is an exploded view of the shelve in the present invention.
Figure 3:
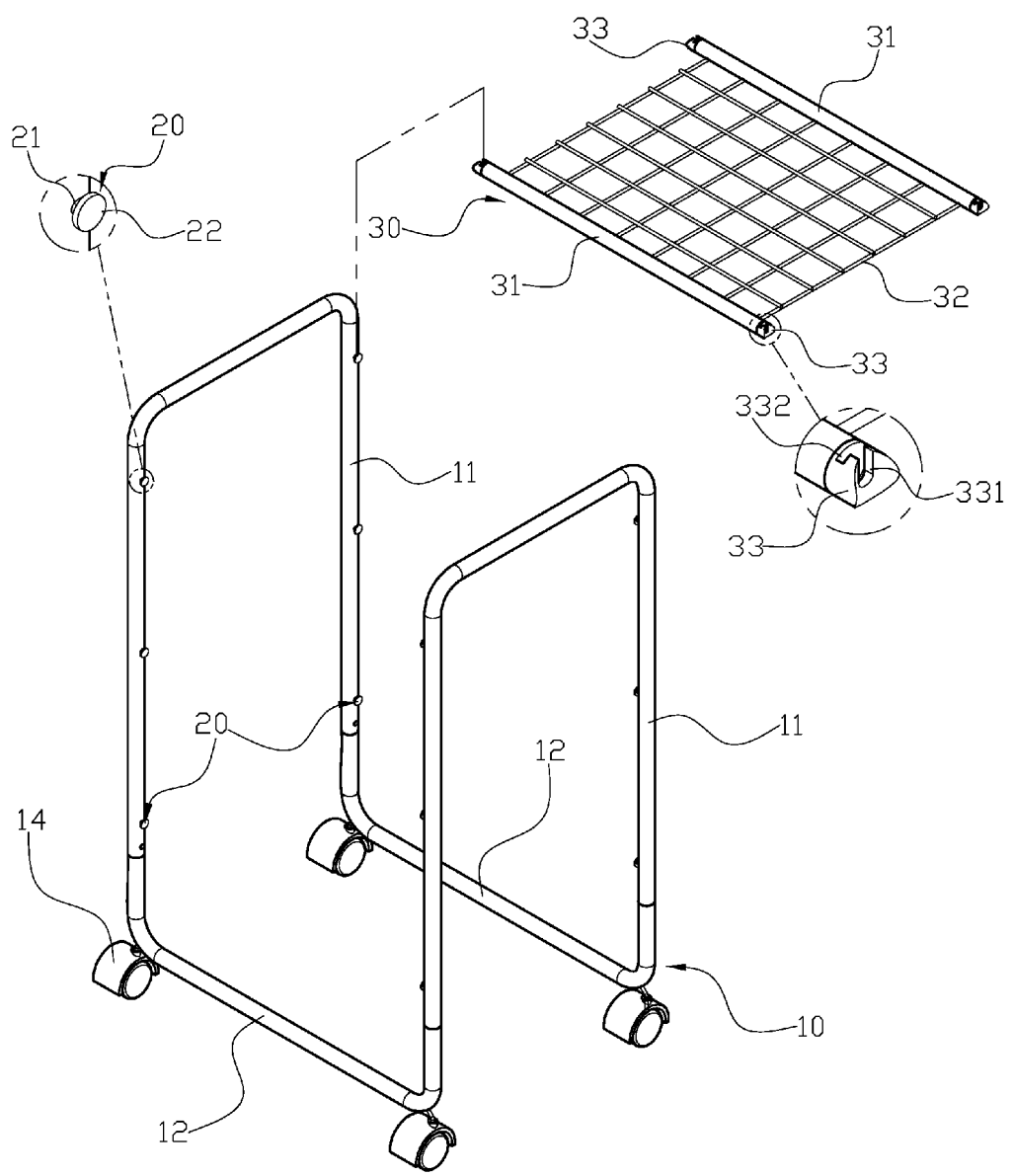
FIG. 3 is an enlarged view of the bearing plate portion of the shelve in the present invention.
Figure 4:
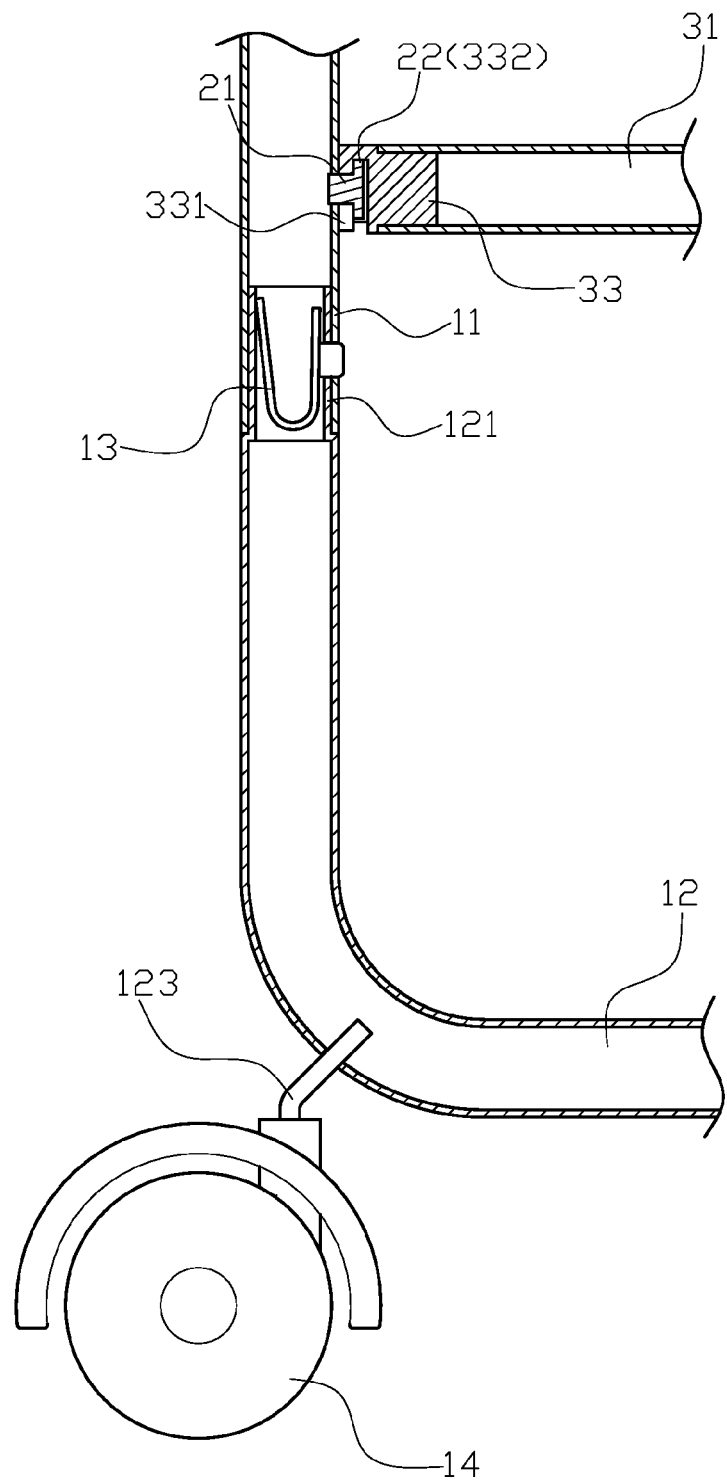
FIG. 4 is a cross section view of the pulley and the connection between "N" shaped frame and the bearing plate of the shelve in the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

The shelve claimed in the present invention, as shown in FIGS. 1-4, comprises: a body (10) with at least one bearing plate (30), which is assembled to the body (10) by the use of the protruded portion of the positioning knob (20). The body

(10) has two "∩" shaped frames (11) and two "U" shaped frames (12). The "U" shaped frame links the two "∩" shaped frames by connecting each of its two ends to one of the neighboring ends of the two "∩" shaped frames. The "U" shaped frame (12) is connected to the "∩" shaped frame by inserting it top ends, the necking zones (121), into the lower ends of the "∩" shaped frames (11). The necking zone of the "U" shaped frame has a "V" shaped elastic clip (13) and when properly positioned, the fastening block protrude out from the positioning holes (111 and 112) and stabilize the connection between the frames. The two "U" shaped frames (12) have four rods (123) protruding downwards and each rod is interposed into the tube of a pulley (14). The positioning knob (20) is located at the inner side of the vertical section of the "∩" shaped frames, and is secured by a horizontal fastening segment (21) ended with an enlarged block (22). The bearing plate (30) consists of two parallel side borders (31) and a mesh-like support structure (32) between the two borders. Both ends of the side border (31) are connected with a fixing apparatus (33), and the apparatus (33) has a U-shaped notch cut (331) at its lower side when placed onto the "∩" shaped frames, and the inner portion of the notch cut (331) expands laterally and forms a slit (332). Both the notch cut (331) and slit (332) do not penetrate through the top surface thus the top side of the connection apparatus remains closed.

The bearing plates can be tool-free DIY installed or uninstalled as illustrated in the FIGS. 1-4. The bearing plate (30) is placed between the two "∩" shaped frames (11) with the notch cut (332) facing downward and allows the U shaped notch cut (331) to slide down and to enclose the horizontal fastening segment (22), thereby achieving the stabilization of the bearing plate by locking the enlarged block (22) into the slit (332). Therefore the shelve in the present invention allows fast and simple installation and uninstallation of the bearing plates, readily and convenient addition or rearrangement of the bearing plates to an installed shelve, and also provides consumers the opportunity to enjoy the process of DIY operation. In addition, the bearing plate (30) provides an inward holding force to the "∩' shaped frames by the secure connection between the slit (332) and the enlarged block (22). Furthermore, the closed top side of the notch cut (331) and slit (332) not only prevents the fixing apparatus (33) to slide away from the positioning knob (20) but allows the bearing plate (30) to support the cargo placed onto it.

Figure 5:
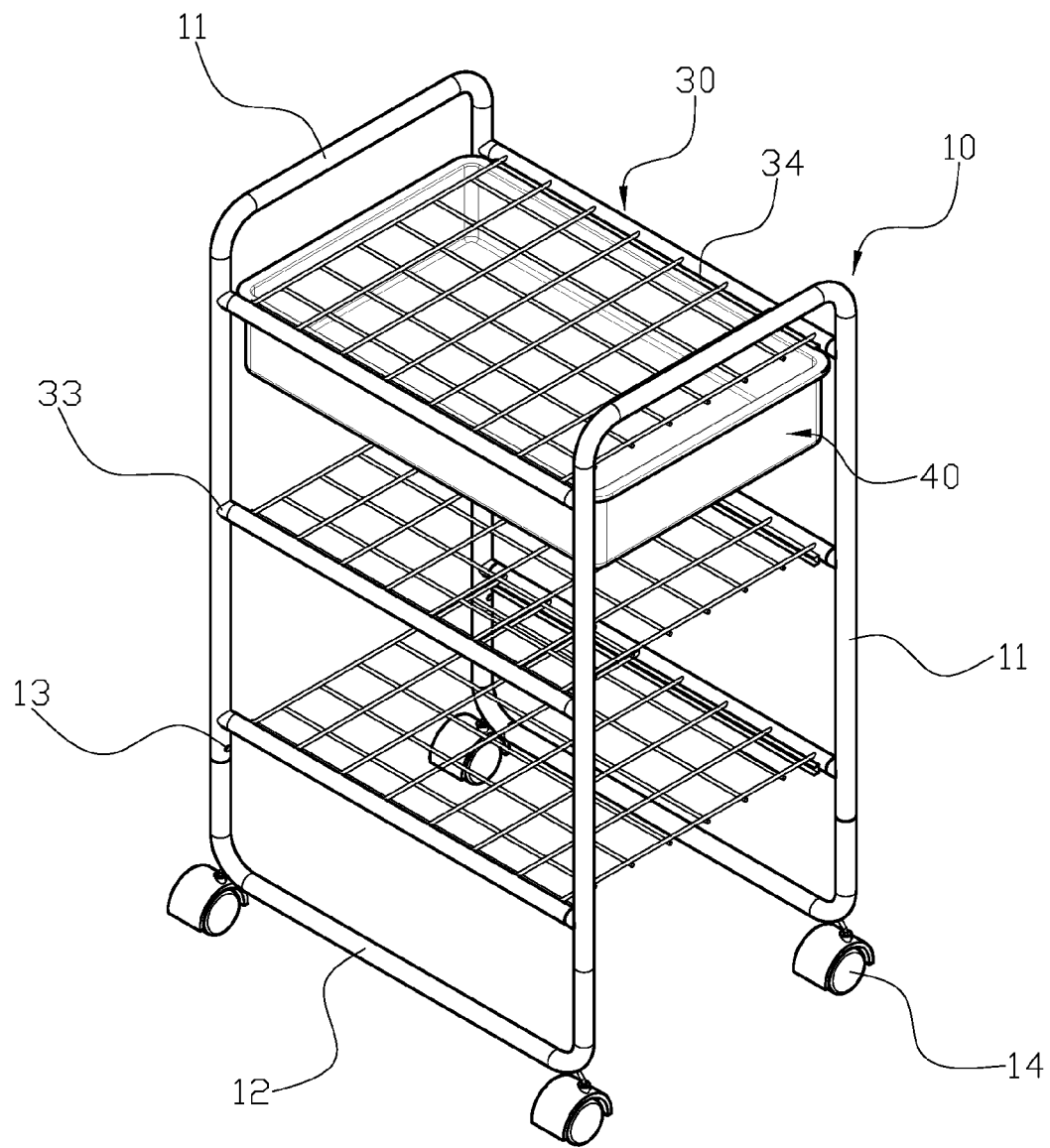
FIG. 5 is a three-dimensional perspective view of another specific embodiment of the present invention.
Figure 6:
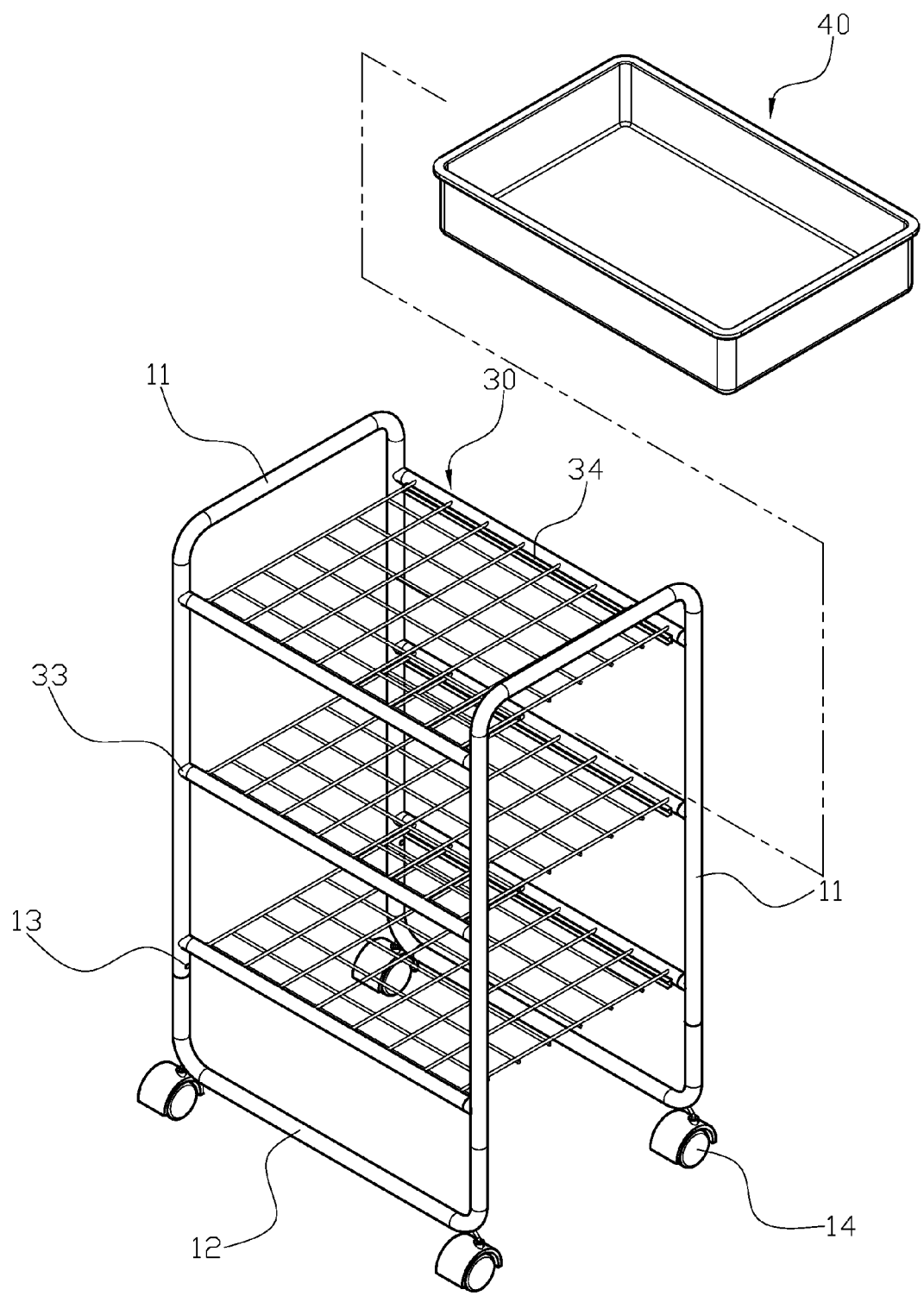
FIG. 6 is an exploded view of another specific embodiment of the present invention.

As illustrated in FIGS. 5 and 6, the two side borders (31) of the bearing plate (30) may be installed with inwardly opening rails (34), and the rails (34) may support the installation and operation of a drawer (40).

Furthermore, the bearing plate (30) may be a wooden plate with enclosed surface.

The above-mentioned embodiments of the present invention provide the following advantages over conventional pipe-based shelves and racks. The shelves in the present invention allow tool-free DIY installation by the customers, including the installation of the bearing plate, the "U" shaped and the "∩" shaped frames, as well as the pulleys, thereby providing customers the opportunity to enjoy the process of DIY installation. In addition, the shelves in the present invention can be conveniently uninstalled into pieces including bearing plates as well as frames, which allows conveniently handling for either short-distance moving or long-distance transportation and also saves storage space. Furthermore, the shelves claimed in the present invention allow convenient addition or rearrangement of the bearing plates, and also allow diverse and flexible setups of the bearing plates to meet different needs.

To summarize, the present invention describes a shelve structure with a breakthrough in structural design, further improved new components, and advantages in practical use and commercial exploration. The present invention has not been disclosed in any published materials and thus possesses novelty.

The above description and illustrations are for one exemplary embodiment of the present invention and should not be considered to limit the scope of the implementation of the present invention. Accordingly, the present invention is not to be considered as limited by the forgoing description, but includes any equivalents.

What is claimed is:

1. A tool-free shelving system comprising a body with at least one bearing plate and a plurality of protruding positioning knobs configured to support the bearing plate,
    said body having two "∩"-shaped frames and two "U"-shaped frames; each of said "∩"-shaped frames having a first substantially horizontal portion and two first substantially vertical portions extending from both ends of the first horizontal portion, while each of said "U"-shaped frames having a second substantially horizontal portion and two second substantially vertical portions, wherein the two "U"-shaped frames are spacedly disposed at a lower portion of the body and connected to two "∩"-shaped frames by connecting the first vertical portions of the "U"-shaped frames to corresponding second vertical portions of the "∩"-shaped frames, such that the "∩"-shaped frames are spacedly disposed at an upper portion of the body, wherein the two "U"-shaped frames are spacedly disposed by a distance that is approximately close to the length of the first horizontal portion of the "∩"-shaped frame, while the two "∩"-shaped frames are spacedly disposed by a distance that is approximately close to the length of the second horizontal portion of the "U"-shaped frame;
    said positioning knobs disposed at an inner portion of the first vertical portions of the "∩"-shaped frames, and connected to one end of a horizontal fastening segment and an enlarged block connected to the other end thereof;
    both sides of each bearing plate having two fixing apparatus and a U-shaped notch cut formed on said fixing apparatus; and a slit formed and connected with the U-shaped notch cut, wherein both the U-shaped notch cut and slit do not penetrate through a top portion of the fixing apparatus;
    wherein the bearing plate is disposed between two "∩"-shaped frames, and the horizontal fastening segment is configured to insert into the U-shaped notch cut and the enlarged block is stopped by the slit to complete the assembly of the shelving system.

2. The tool-free shelving system of claim 1, wherein said "U" shaped frame is connected to the "∩" shaped frame by inserting necking zones at top ends of the "U" shaped frame into bottom ends of the "∩" shaped frames, said necking zone having a "V" shaped elastic clip that connects the "∩' and "U" shaped frames.

3. The tool-free shelving system of claim 1, wherein said bearing plate comprises two parallel side borders and a support structure with meshes between the two borders.

4. The tool-free shelving system of claim 1, wherein said bearing plate has two rails with inward openings and a drawer is configured to slide therein.

* * * * *